United States Patent
Okano et al.

(10) Patent No.: US 11,841,609 B2
(45) Date of Patent: Dec. 12, 2023

(54) ELECTRONIC APPARATUS WITH ACCESSORY SHOE DEVICE AND ACCESSORY ATTACHABLE TO ACCESSORY SHOE DEVICE

(71) Applicant: CANON KABUSHIKI KAISHA, Tokyo (JP)

(72) Inventors: Yoshinobu Okano, Saitama (JP); Kenji Ishii, Kanagawa (JP); Yuichi Ariga, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 11 days.

(21) Appl. No.: 17/721,518

(22) Filed: Apr. 15, 2022

(65) Prior Publication Data
US 2022/0350228 A1 Nov. 3, 2022

(30) Foreign Application Priority Data
Apr. 28, 2021 (JP) ................ 2021-076428

(51) Int. Cl.
*G03B 17/56* (2021.01)
*G03B 15/05* (2021.01)
*H01R 33/76* (2006.01)
*H01R 24/66* (2011.01)
*H01R 107/00* (2006.01)

(52) U.S. Cl.
CPC ........... *G03B 17/566* (2013.01); *G03B 15/05* (2013.01); *H01R 24/66* (2013.01); *H01R 33/765* (2013.01); *G03B 2215/056* (2013.01); *H01R 2107/00* (2013.01)

(58) Field of Classification Search
CPC ............ G03B 17/566; G03B 2215/056; H01R 33/765; H01R 24/66
See application file for complete search history.

(56) References Cited

U.S. PATENT DOCUMENTS

| 9,049,378 | B2 | 6/2015 | Motoki et al. | |
| 2017/0222384 | A1* | 8/2017 | Seo | H04N 23/50 |
| 2018/0348608 | A1* | 12/2018 | Kamiya | H04N 23/663 |
| 2019/0386412 | A1* | 12/2019 | Goupil | H01R 12/7082 |
| 2020/0264496 | A1* | 8/2020 | Okano | H04N 23/56 |

FOREIGN PATENT DOCUMENTS

JP  2013-034172 A  2/2013

* cited by examiner

*Primary Examiner* — Clayton E. LaBalle
*Assistant Examiner* — Diana Hancock
(74) *Attorney, Agent, or Firm* — Cowan, Liebowitz & Latman, P.C.

(57) ABSTRACT

An electronic apparatus that is capable of reducing occurrence of malfunction when an accessory is attached without enlarging an accessory shoe device. The electronic apparatus includes an accessory shoe device and a controller. The accessory shoe device is electrically connectable with an accessory and has terminals that are arranged in a line in a first direction that intersects perpendicularly with an attaching direction of the accessory. The controller is electrically connected to the terminals. At least one of the terminals differs from the other terminals in a length of an externally exposed part in a second direction that intersects perpendicularly with both the attaching direction and the first direction.

17 Claims, 11 Drawing Sheets

ELECTRONIC APPARATUS WITH ACCESSORY SHOE DEVICE AND ACCESSORY ATTACHABLE TO ACCESSORY SHOE DEVICE

BACKGROUND OF THE INVENTION

Field of the Invention

The present invention relates to an electronic apparatus with an accessory shoe device and an accessory attachable to the accessory shoe device.

Description of the Related Art

There is a known image pickup apparatus as an example of an electronic apparatus equipped with an accessory shoe device to which an accessory like a lighting device (an electronic flash device) is attachable. The accessory shoe device mechanically holds the accessory by engaging with a shoe device of the accessory and electrically connects the accessory with the image pickup apparatus. Accordingly, the accessory shoe device and shoe device respectively have an engagement part and an engaged part that are engaged mutually, and they have connection terminals that enable two-way communication of a clock signal and a data signal between the image pickup apparatus and the accessory.

For example, the connection terminals provided in each of the accessory shoe device and shoe device are arranged in a line at predetermined intervals in a direction that intersects perpendicularly with an attaching direction of the shoe device to the accessory shoe device. In this case, when an arrangement pitch of the connection terminals is narrowed, kinds of signals communicable between the image pickup apparatus and accessory increase without enlarging the accessory shoe device and shoe device.

However, when an arrangement pitch of the connection terminals is narrowed, variation of an electric potential of a terminal, such as a clock signal terminal or a data signal terminal, easily affects to a connection terminal of an adjacent signal line, which easily causes malfunction in the image pickup apparatus or the accessory.

In view of such a problem, Japanese Laid-Open Patent Publication (Kokai) No. 2013-34172 (JP 2013-34172A, Counterpart of U.S. Pat. No. 9,049,378) discloses a configuration that arranges a plurality of connection terminals in a line at predetermined intervals and that arranges GND terminals that provide reference potential at both sides of a clock signal terminal. This reduces noise due to a clock signal between the image pickup apparatus and accessory to other signal terminals and hardly malfunctions thereby.

However, when the shoe device inclines to the accessory shoe device while attaching the shoe device to the accessory shoe device (see FIG. 5B), an order of connections between connection terminals differs from a planned order, which may cause malfunction as a result. The technique described in the above-mentioned publication cannot solve such a problem.

In order to avoid the problem, a configuration that shifts connection terminals in the attaching direction according to the planned order of connections without aligning the connection terminals of the accessory shoe device in a lateral direction to the attaching direction can be considered. However, in the configuration that shifts the connection terminals in the attaching direction, the sizes of the accessory shoe device and shoe device increase as the number of terminals to be shifted increases.

SUMMARY OF THE INVENTION

The present invention provides an electronic apparatus that is capable of reducing occurrence of malfunction when an accessory is attached without enlarging an accessory shoe device.

Accordingly, a first aspect of the present invention provides an electronic apparatus including an accessory shoe device that is electrically connectable with an accessory and has terminals that are arranged in a line in a first direction that intersects perpendicularly with an attaching direction of the accessory, and a controller that is electrically connected to the terminals, wherein at least one of the terminals differs from other terminals in a length of an externally exposed part in a second direction that intersects perpendicularly with both the attaching direction and the first direction.

According to the electronic apparatus of the present invention, occurrence of malfunction can be reduced without enlarging the accessory shoe device.

Further features of the present invention will become apparent from the following description of exemplary embodiments with reference to the attached drawings.

DESCRIPTION OF THE EMBODIMENTS

Figure 1:
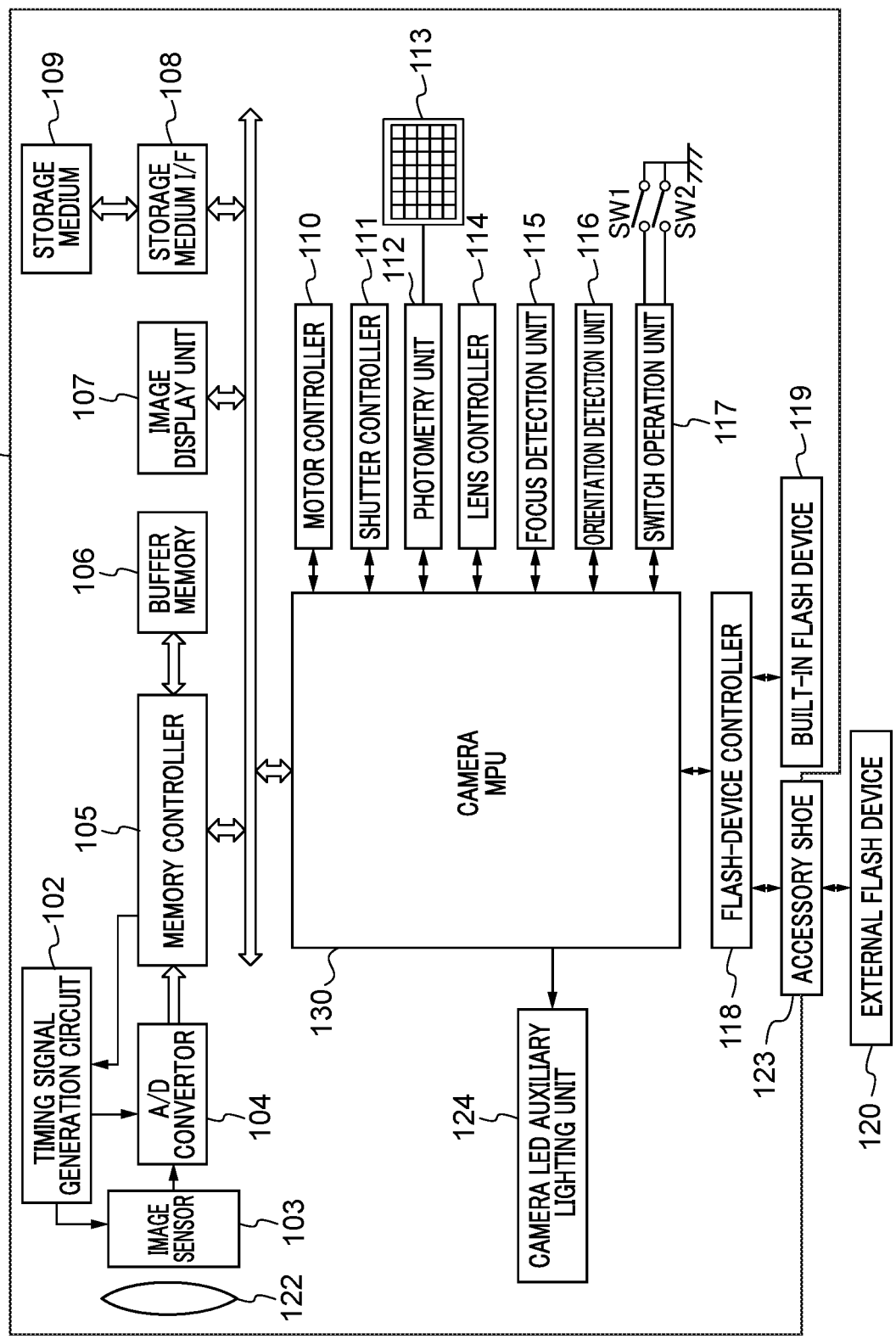
FIG. 1 is a block diagram schematically showing a configuration of an image pickup apparatus of an embodiment.

Hereafter, embodiments according to the present invention will be described in detail by referring to the drawings. In the following description, an image pickup apparatus with an accessory shoe device is taken up as an electronic apparatus according to the present invention, and an electronic flash device is taken up as an accessory with a shoe device that engages with the accessory shoe device. However, an electronic apparatus with an accessory shoe device is not limited to an image pickup apparatus. Moreover, an accessory that is attachable to an image pickup apparatus is not limited to an electronic flash device. Accessories in connection with image pickup, such as an electronic view finder, a microphone for capturing a video image, intermediate accessories (a conversion adaptor and a multiple joint adapter), various measurement apparatuses, a sub camera, may be employed. The image pickup apparatus and the electronic flash device constitute an image pickup system. Since an intermediate accessory is provided with a shoe device that engages with an accessory shoe device of an electronic apparatus and an accessory shoe device that engages with a shoe device of an accessory, it is equivalent to an accessory viewed from the electronic apparatus and is equivalent to an electronic apparatus viewed from the accessory.

FIG. 1 is a block diagram schematically showing a configuration of the image pickup apparatus 100. Specifically, the image pickup apparatus 100 is a digital camera. The image pickup apparatus 100 has a camera MPU 130, an image pickup optical system 122, a timing signal generating circuit 102, an image sensor 103, an A/D converter 104, a memory controller 105, and a buffer memory 106. Moreover, the image pickup apparatus 100 has an image display unit 107, a storage medium I/F 108, a storage medium 109, a motor controller 110, a shutter controller 111, a photometry unit 112, a multi-division photometry sensor 113, a lens controller 114, a focus detection unit 115, an orientation detection unit 116, and a switch operation unit 117. Furthermore, the image pickup apparatus 100 has a flash-device controller 118, a built-in lighting flash device 119, a camera LED auxiliary lighting unit 124, and the accessory shoe device (hereinafter referred to as an "accessory shoe") 123.

The accessory shoe 123 can be equipped with the external flash device 120. Moreover, the storage medium 109 like a semiconductor memory is detachable from a body (housing) of the image pickup apparatus 100. It should be noted that the storage medium 109 may be a hard disk built in the image pickup apparatus 100, an optical disk that is attachable to the image pickup apparatus 100, or the like.

The camera MPU 130 is what is called a microcomputer and totally controls an image pickup sequence of the image pickup apparatus 100 and entire operations of the image pickup system. The image pickup optical system 122 includes a plurality of lens groups, such as a zoom lens and a focusing lens, a diaphragm, and a shutter, and forms an optical image (object image) on the image sensor 103 by refracting light from an object. The image sensor 103 is a CCD sensor, a CMOS sensor, or the like that captures (photoelectrically converts) the optical image. The timing signal generating circuit 102 generates a timing signal required for the operation of the image sensor 103 and supplies it to the image sensor 103.

The A/D converter 104 converts an analog signal read from the image sensor 103 into a digital signal (image data). The memory controller 105 controls reading and writing of a memory (not shown) and controls a refreshment operation of the buffer memory 106. The buffer memory 106 temporarily stores image data output from the A/D converter 104 and display image data for displaying an image on the image display unit 107. The image display unit 107 has a display device, such as a liquid crystal panel or an organic EL panel, and displays the image data stored in the buffer memory 106.

The storage medium I/F 108 is an interface that enables communication between the camera MPU 130 and the storage medium 109 that is mounted in the image pickup apparatus 100. The motor controller 110 controls motors (not shown) according to signals from the camera MPU 130 so as to move up and down a mirror (not shown) and to charge the shutter. The shutter controller 111 controls exposure of the image sensor 103 by making a front curtain and a rear curtain of the shutter travel according to a signal from the camera MPU 130. The multi-division photometry sensor 113 measures luminance values in divided areas in an image-pickup region. The photometry unit 112 outputs luminance signals of the respective areas to the camera MPU 130.

The camera MPU 130 calculates values for exposure control, such as an AV (aperture value), a TV (shutter speed), ISO (sensitivity of the image sensor 103), on the basis of the luminance signals obtained from the photometry unit 112. The photometry unit 112 outputs luminance signals detected when the built-in flash device 119 or the external flash device 120 performs pre-emission towards a field to the camera MPU 130. The camera MPU 130 calculates a main emission amount of the external flash device 120 at a time of main exposure (main image pickup) on the basis of these luminance signals.

The lens controller 114 communicates with the camera MPU 130 through mount contacts (not shown) and controls focus and aperture of the image pickup optical system 122 by controlling a lens drive motor and diaphragm drive motor (not shown). The focus detection unit 115 detects a defocus amount of the image pickup optical system 122 by using a focus detection method like a phase difference detection method. The camera MPU 130 calculates a drive amount of the focusing lens on the basis of the detected defocus amount and performs auto focus (AF) by controlling the lens drive motor through the lens controller 114.

The orientation detection unit 116 detects a tilt of the digital camera 100 in a rotational direction around an optical axis of the image pickup optical system 122. The switch operation unit 117 has a first switch (SW1) that becomes ON when a release button (not shown) is pressed in a first stroke (half press) and a second switch (SW2) that becomes ON when the release button is pressed in a second stroke (full press). The ON signals from the SW1 and SW2 are output to the camera MPU 130. The camera MPU 130 starts image-pickup preparation operations, such as the AF and photometry, in response to the ON signal from the SW1. And the camera MPU 130 starts an image pickup (exposure) operation in response to the ON signal from the SW2. It should be noted that a signal that responds to an operation of an operating member (not shown) other than the SW1 and SW2 is also detected by the switch operation unit 117 and is output to the camera MPU 130.

According to instructions from the camera MPU 130, the flash-device controller 118 controls emission operations (preliminary emission, main emission, and auxiliary light emission, etc.) of the built-in flash device 119 and controls the emission operations of the external flash device 120 attached to the accessory shoe 123. Moreover, when detecting attachment of the external flash device 120 to the accessory shoe 123, the flash-device controller 118 starts supplying electric power to the external flash device 120 through the accessory shoe 123. The configuration of the accessory shoe 123 will be mentioned below in detail.

The camera LED auxiliary lighting unit 124 irradiates a field with near-infrared light (LED auxiliary light) of a predetermined pattern used as auxiliary light for focus detection by the focus detection unit 115. The camera MPU 130 instructs emission of the auxiliary light to the built-in flash device 119 or the external flash device 120 through the flash-device controller 118 for the focus detection on the basis of the luminance signal from the photometry unit 112. Moreover, the camera MPU 130 instructs emission of the LED auxiliary light to the camera LED auxiliary lighting unit 124 or instructs emission of LED auxiliary light for the focus detection to an LED auxiliary lighting unit 207 (see FIG. 2) of the external flash device 120 through the flash-device controller 118.

Figure 2:
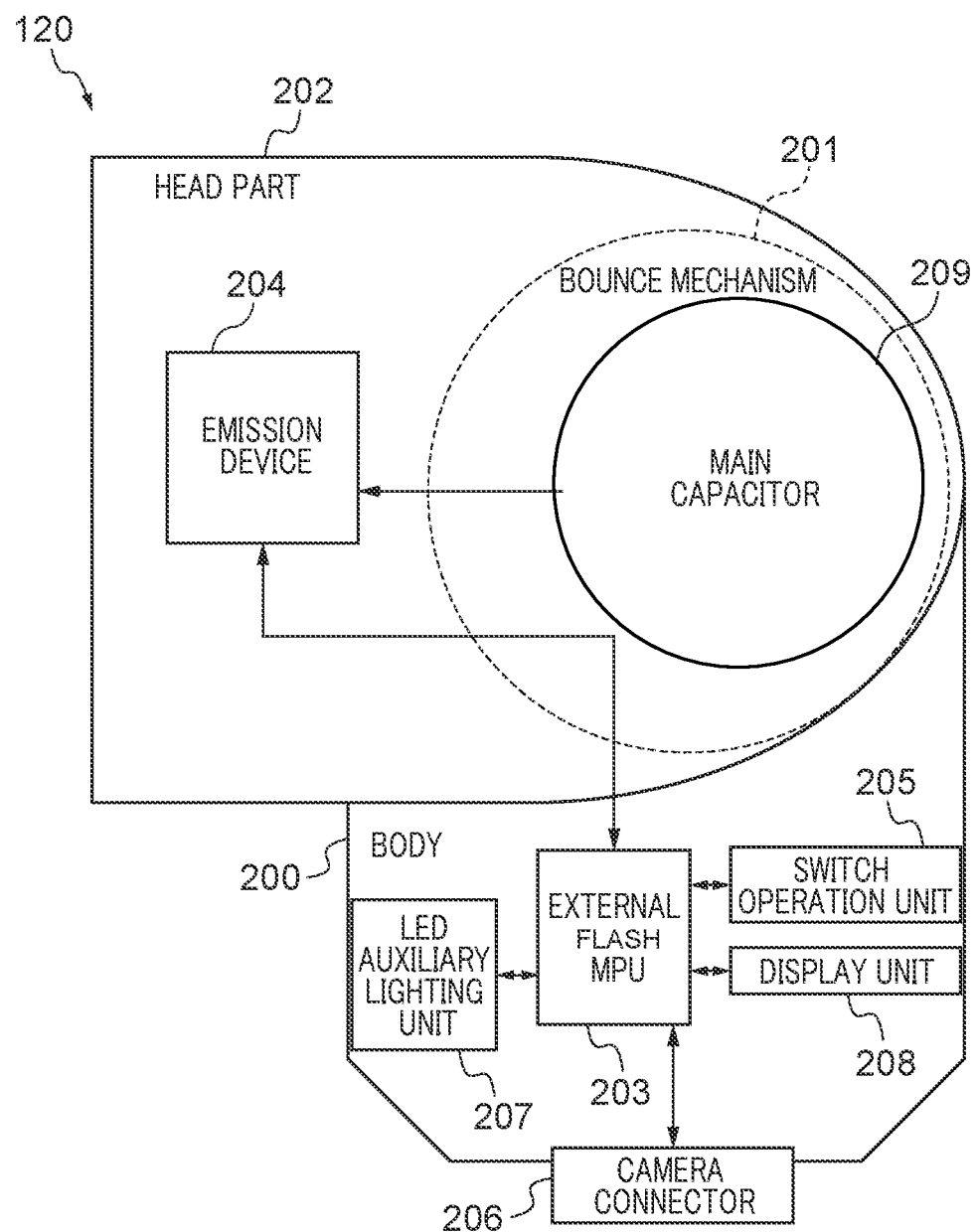
FIG. 2 is a block diagram schematically showing a configuration of an external flash device that is attachable to the image pickup apparatus shown in FIG. 1.

FIG. 2 is a block diagram schematically showing a configuration of the external flash device 120. The external flash device 120 has a body 200, a bounce mechanism 201, and a head part 202. The body 200 has an external flash MPU (hereinafter referred to as a "flash MPU") 203, a main capacitor 209, a switch operation unit 205 including a power switch etc., a display unit 208, the LED auxiliary lighting unit 207, and a camera connector 206.

The external flash MPU 203 is implemented on a main substrate (not shown) and controls all operations including an emission control sequence of the external flash device 120. The camera connector 206 is a shoe device that mechanically and electrically connects the external flash device 120 to the accessory shoe 123 of the image pickup apparatus 100. The camera MPU 130 communicates with the external flash MPU 203 through the flash-device controller 118, the accessory shoe 123, and the camera connector 206. Details of the configuration of the camera connector 206 will be mentioned later.

The LED auxiliary lighting unit 207 irradiates a field with near-infrared light (LED auxiliary light) to project a predetermined pattern used as auxiliary light of the focus detection control by the camera MPU 130 through the focus detection unit 115 as with the camera LED auxiliary lighting unit 124. The bounce mechanism 201 enables rotation of the head part 202 with respect to the body 200 in a horizontal direction and a vertical direction. A user can change an emission direction of illumination light (flash light) from the head part 202 by rotating the head part 202. Use of the bounce mechanism 201 allows what is called bounce photography by lighting an object indirectly.

The head part 202 has an emission device 204 that emits flash light. The emission device 204 has a light source, such as a light discharge tube (xenon tube) or an LED, a reflection umbrella, a Fresnel lens, and an emission circuit. The emission circuit controls the light source to emit light according to a signal from the external flash MPU 203.

Figure 3A:
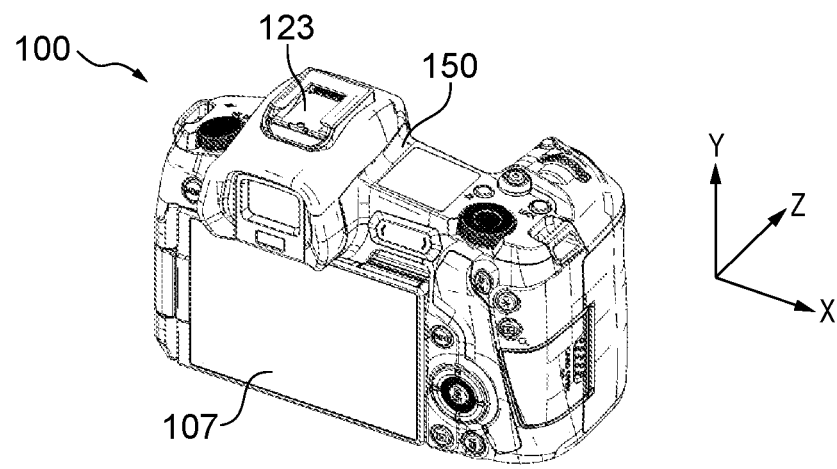
FIG. 3A is a perspective view showing the image pickup apparatus shown in FIG. 1 viewed from a rear side.
Figure 3B:
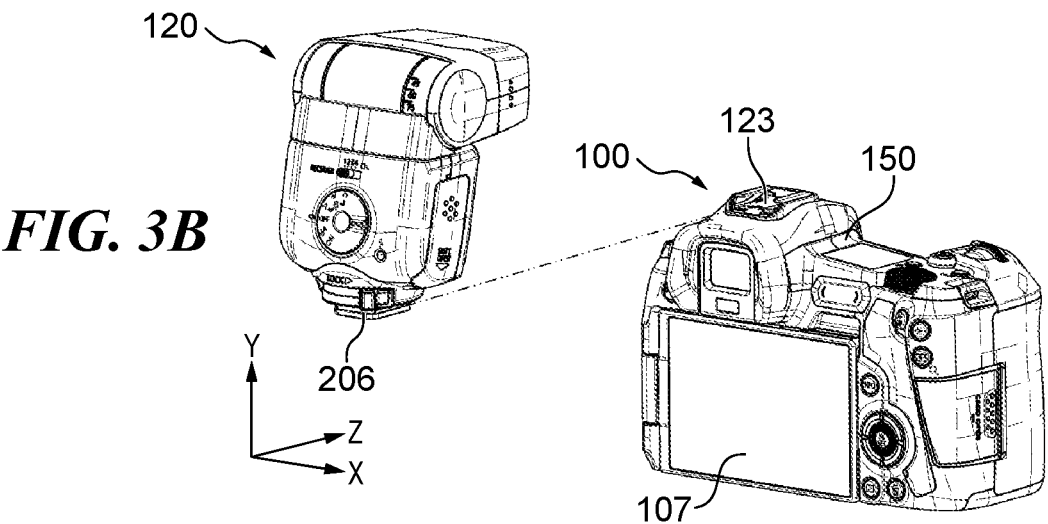
FIG. 3B is a perspective view showing a method for attaching the external flash device in FIG. 2 to an accessory shoe of the digital camera.
Figure 3C:
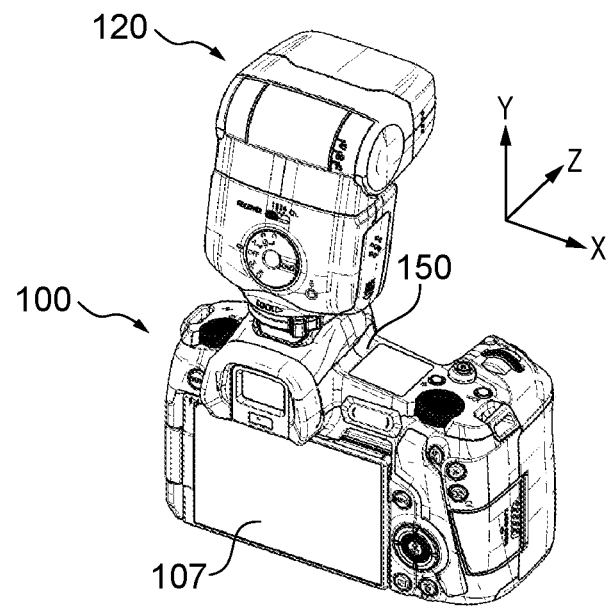
FIG. 3C is a perspective view showing a state where the external flash device is attached to the digital camera.

FIG. 3A is a perspective view showing the image pickup apparatus 100 viewed from a slant rear side. FIG. 3B is a schematic view showing a method for attaching the external flash device 120 to the accessory shoe 123 of the image pickup apparatus 100. FIG. 3C is a perspective view showing the state where the image pickup apparatus 100 is equipped with the external flash device 120 viewed from a slant rear side.

As shown in FIG. 3A through FIG. 3C, an X-direction, a Y-direction, and a Z-direction that mutually intersect perpendicularly are defined to the image pickup apparatus 100 and external flash device 120 for convenience of description. The Z-direction is parallel to the optical axis of the image pickup optical system 122 and is a front-and-back direction of the image pickup apparatus 100. The X-direction is a width direction of the image pickup apparatus 100 and intersects perpendicularly with the Z-direction in a horizontal plane when the Z-direction is in the horizontal plane. The Y-direction is a height direction of the image pickup apparatus 100 and intersects perpendicularly with both the Z-direction and X-direction. Moreover, an arrow of each direction shows a positive direction (+ direction).

The image pickup optical system 122 (not shown in FIG. 3A through FIG. 3C) is provided in the front side (field side) of the image pickup apparatus 100, and the image display unit 107 is provided in the back side of the image pickup apparatus 100. A top cover 150 as an exterior member is provided in the upper part of the image pickup apparatus 100. The accessory shoe 123 is arranged to the top cover 150. In the meantime, the camera connector 206 is provided in the bottom of the external flash device 120.

As shown in FIG. 3B, when a user slides the external flash device 120 to the image pickup apparatus 100 in the +Z direction from the rear side toward the front side of the image pickup apparatus 100, the user can engage the camera connector 206 with the accessory shoe 123. Thereby, the external flash device 120 is attached to the image pickup apparatus 100. When detaching the external flash device 120 from the image pickup apparatus 100, the user slides the external flash device 120 in the −Z direction from the front side toward the rear side of the image pickup apparatus 100.

Figure 4A:
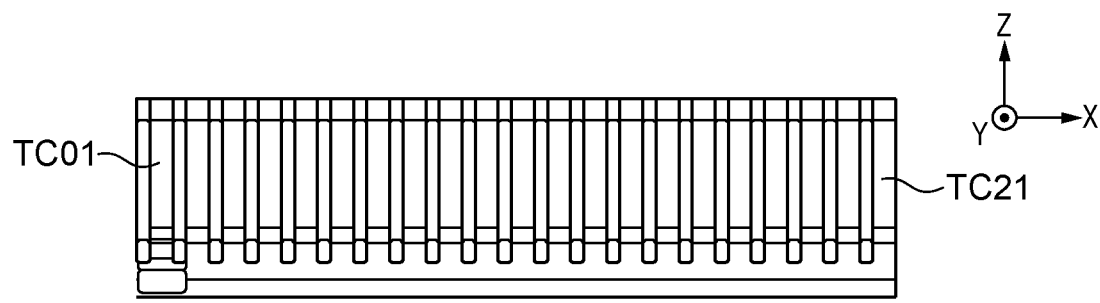
FIG. 4A is a view showing an arrangement of terminals of the accessory shoe and FIG. 4B is a view showing an arrangement of terminals of a camera connector.
Figure 4B:
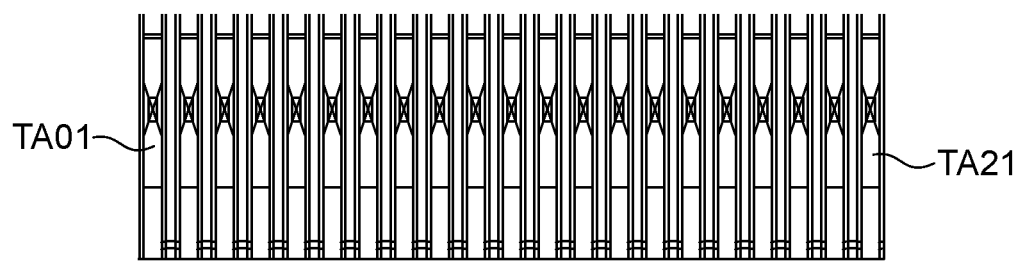

FIG. 4A is a view showing an arrangement example of twenty-one terminals TC01 through TC21 in the accessory shoe 123 of the image pickup apparatus 100. FIG. 4B is a view showing an arrangement example of twenty-one terminals TA01 through TA21 in the camera connector 206 of the external flash device 120.

The image pickup apparatus 100 and the external flash device 120 are electrically connected, because the terminals TC01 through TC21 of the accessory shoe 123 respectively contact the terminals TA01 through TA21 of the camera connector 206 one-to-one. In the accessory shoe 123, the terminal TC01 is arranged at a right end viewed from the object side, and the twenty-one terminals to the terminal TC21 arranged at a left end are arranged in a line in the X-direction at constant intervals. Similarly, in the camera connector 206, the terminal TA01 is arranged at a right end viewed from the object side, and the twenty-one terminals to the terminal TA21 arranged at a left end are arranged in a line in the X-direction at constant intervals. Although the number of the terminals of the accessory shoe 123 is equal to the number of the terminals of the camera connector 206 in this embodiment, they do not necessarily need to be equal.

Figure 5A:
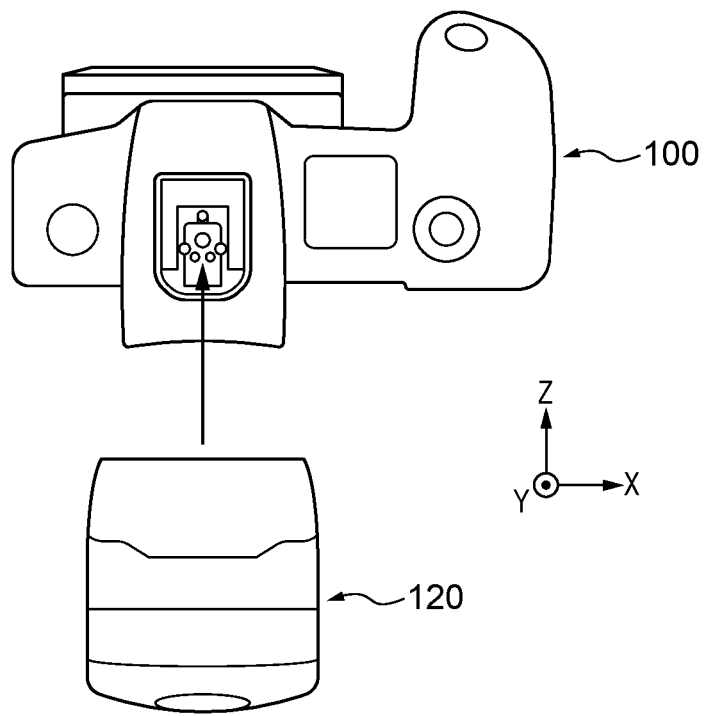
FIG. 5A and FIG. 5B are views showing examples of operations that attach the external flash device to the image pickup apparatus.

FIG. 5A is a view showing a normal attachment method of the external flash device 120 to the image pickup apparatus 100. As shown in FIG. 5A, the camera connector 206 is engaged with the accessory shoe 123 by sliding the camera connector 206 to the accessory shoe 123 in parallel to the Z-direction as an attaching direction. Then, the terminals TC01 through TC21 approximately simultaneously contact the corresponding terminals TA01 through TA21 one-to-one.

Figure 5B:
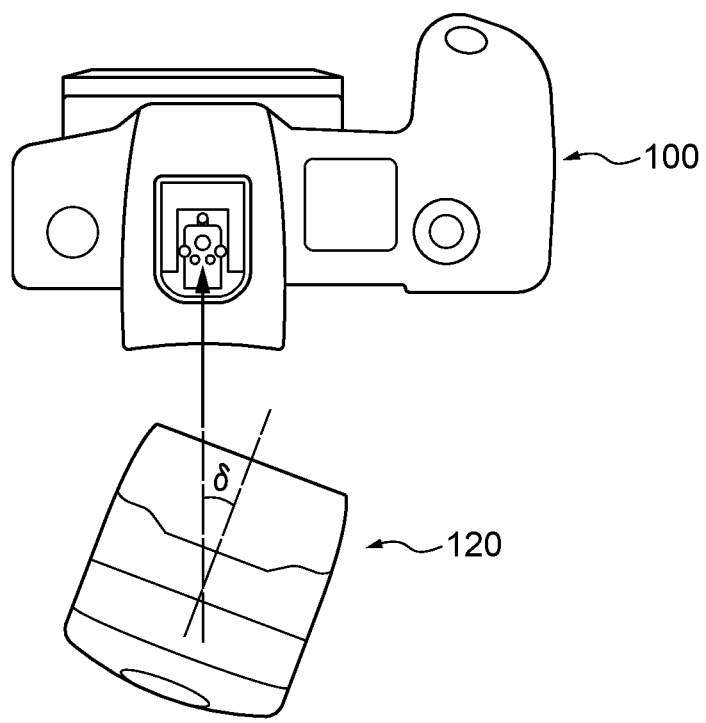

However, when an attaching operation is performed in a state where an excessive load in a rotational direction is applied to the external flash device 120, a contact state may differ from a normal contact state. FIG. 5B exaggerates an operation that attaches the external flash device 120 to the image pickup apparatus 100 in a state where a load in the rotational direction is applied to the external flash device 120 (a state where tilt of angle δ to the Z-direction occurs).

In this case, the terminal TC01 of the accessory shoe 123 first contacts the terminal TA01 of the camera connector 206, and the terminal TC21 finally contacts the terminal TA21. Moreover, when the attaching operation of the external flash device 120 is stopped on the way, the terminal TC21 may not contact the terminal TA21.

In order to solve this issue, a method to extend the terminal TC21 in the Z direction as the attaching direction can be considered. However, such a method enlarges the accessory shoe 123. Accordingly, the first embodiment enables to change a contact order of the terminals of the accessory shoe 123 and camera connector 206 by providing a high standing wall 123b (see FIG. 6B) to a specific terminal as mentioned below while keeping the arrangement of the terminals in a line at the constant intervals.

Figure 6A:
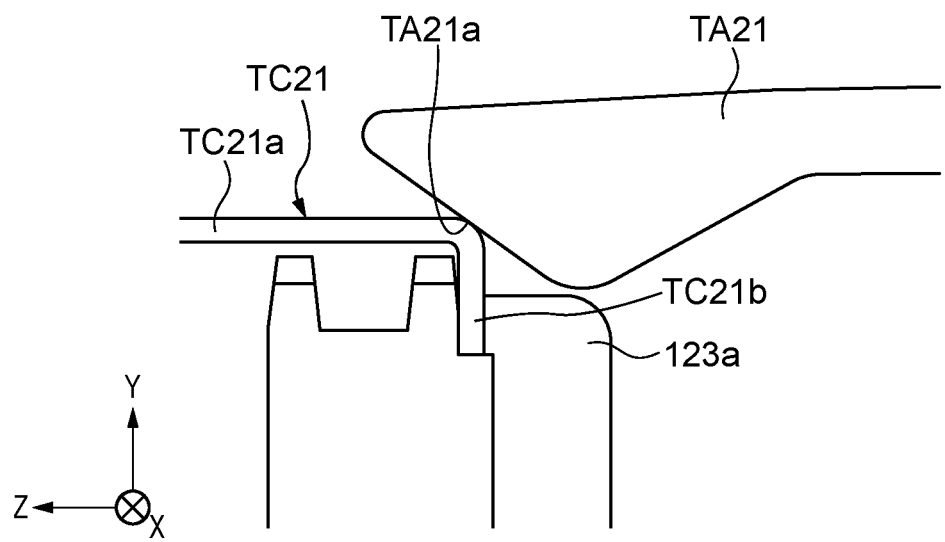
FIG. 6A and FIG. 6B are sectional views showing examples of states where a terminal of the accessory shoe contacts a terminal of the camera connector in a first embodiment.
Figure 6B:
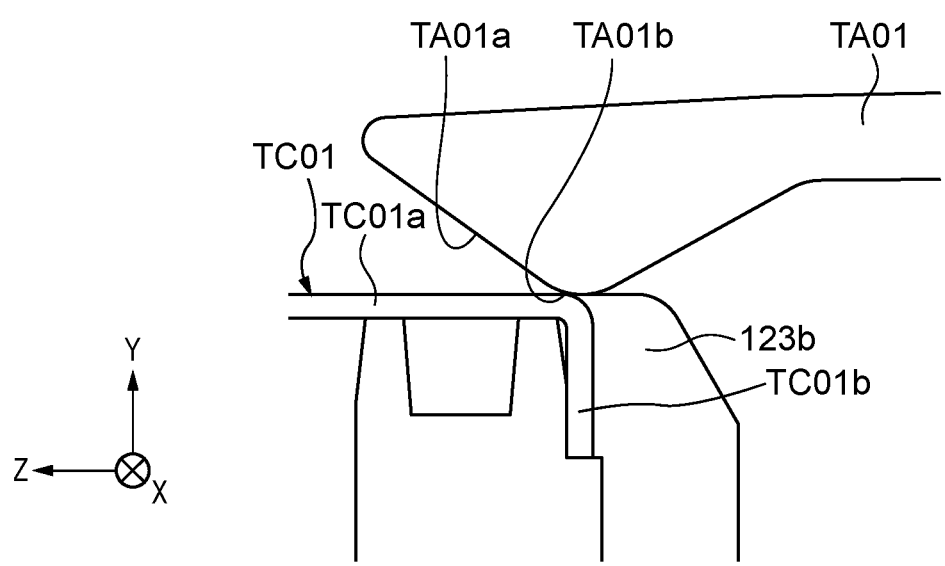

FIG. 6A is a sectional view showing a state when the terminal TC21 of the accessory shoe 123 contacts the terminal TA21 of the camera connector 206. FIG. 6B is a sectional view showing a state when the terminal TC01 of the accessory shoe 123 contacts the terminal TA01 of the camera connector 206.

As shown in FIG. 6A, the terminal TC21 is provided with a first portion TC21a extended in the Z-direction that is the attaching direction of the external flash device 120 and a second portion TC21b extended in the −Y-direction (downward in FIG. 6A) that intersects perpendicularly with the attaching direction. A low standing wall 123a formed from dielectric material (for example, non-conductive resin material) is provided adjacently to the side surface at the −Z side of the second portion TC21b extended in the −Y-direction of the terminal TC21. It should be noted that the low standing wall 123a holds the terminal TC21. When the terminal TA21 is slid in the +Z-direction and contacts the terminal TC21 at a contact point TA21a, the communication between the image pickup apparatus 100 and external flash device 120 becomes available via the terminals TA21 and TC21.

As shown in FIG. 6B, the terminal TC01 is provided with a first portion TC01a extended in the Z-direction that is the attaching direction of the external flash device 120 and a second portion TC01b extended in the −Y-direction (downward in FIG. 6B) that intersects perpendicularly with the attaching direction. A high standing wall 123b formed from dielectric material is provided adjacently to the side surface at the −Z side (the side surface facing an approaching direction of the camera connector 206 at the time of attachment of the external flash device 120) of the second portion TC01b extended in the −Y-direction of the terminal TC01. It should be noted that the high standing wall 123b holds the terminal TC01. A comparison between FIG. 6A and FIG. 6B shows that a length of an externally exposed part of the terminal TC01 in the −Y-direction differs from that of the terminal TC21. Lengths of externally no-exposed parts of the terminals covered by the standing wall may be different mutually. When the terminal TA01 is slid in the +Z-direction and contacts the terminal TC01 at a contact point TA01b, the communication between the image pickup apparatus 100 and external flash device 120 becomes available via the terminals TA01 and TC01.

A contact point TA01a shown in FIG. 6B corresponds to the contact point TA21a in FIG. 6A. If the terminal TA01 were to slide in the Z-direction to a terminal equivalent to the terminal TC21 held by the low standing wall 123a, the terminal TA01 would contact the equivalent terminal at the contact point TA01a. However, since the high standing wall 123b is more highly formed in the +Y-direction (upward in FIG. 6A) than the low standing wall 123a, the terminal TA01 contact the terminal TC01 at the contact point TA01b without contacting the terminal TC01 at the contact point TA01a. That is, a timing at which the terminal TA01 contacts the terminal TC01 can be delayed from a timing at which the terminal TA21 contacts the terminal TC21 by a period required for the movement of the terminal TA01 by the distance between the contact point TA01a and the contact point TA01b in the Z-direction.

Moreover, although the terminal TA21 made from metal material first contacts the terminal TC21 made from metal material, the terminal TA01 made from metal material contacts the terminal TC01 made from metal material after contacting the high standing wall 123b made from resin material. Since the terminal TA01 contacts the high standing wall 123b, the high standing wall 123b can absorb impact of attachment of the camera connector 206 to the accessory shoe 123. Since the high standing wall 123b is formed so as to have a slant surface that inclines by a predetermined angle to the Y-direction as shown in FIG. 6B, the impact can be effectively released.

In order to shift a contact timing of the terminals, the high standing wall 123b may be higher than the terminal TC01 (may be projected to the +Y side), or a part of the first portion TC01a of the terminal TC01 extended in the Z-direction may be covered with the high standing wall 123b. Although the two kinds of low and high standing walls 123a and 123b (standing walls having one step) are described in the first embodiment, three or more kinds of standing walls of which heights are different (standing walls having two or more steps) may be employed.

As mentioned above, since the standing walls of which heights are different are provided for the respective terminals of the accessory shoe 123, the contact order of the terminals of the camera connector 206 to the accessory shoe 123 can be changed while keeping the arrangement of the terminals in a line. Thereby, even if the attaching operation is performed in the state where the external flash device 120 is inclined to the attaching direction as shown in FIG. 5B, the change of the contact order of the terminals can be prevented, which enables the terminals to contact in the predetermined order.

It should be noted that communication of attachment detection of the external flash device 120 is allocated to the terminals TC01 and TA01 in the first embodiment. If the attachment detection terminals TC01 and TA01 were to contact in the early stage of the attaching operation, communication would start without waiting for contacts of the other terminals, which would cause communication error. In order to avoid such a situation, the attachment detection terminals contact after the other communication terminals and power supply terminals contact in the first embodiment. When the attachment detection terminals contact, the other communication terminals and power supply terminals have already contacted certainly. Moreover, it is preferable that GND terminals to which electric potential of the ground (GND) is allocated contact at the beginning in order to prevent failure and malfunction of an apparatus. This is easily achievable by changing the contact timing according to the first embodiment. In this way, according to the first embodiment, occurrence of a communication error due to connections of the terminals in an unintended contact order is avoidable.

Incidentally, the external flash device 120 may be attached in a state where it is inclined in a direction opposite to the direction shown in FIG. 5B. In that case, the terminals TA21 and TC21 contact first, and the terminals TA01 and TC01 contact finally. Accordingly, even if the terminal TC01 is held by the high standing wall 123b, a problem does not arise at all.

Next, a second embodiment will be described. In the second embodiment, a modified example of the accessory shoe 123 described in the first embodiment will be described. Since the configurations of the image pickup apparatus 100 and external flash device 120 are similar to that of the first embodiment except for the accessory shoe 123, their descriptions are omitted. The same reference numerals as the first embodiment are used for the accessory shoe and camera connector.

Figure 7:
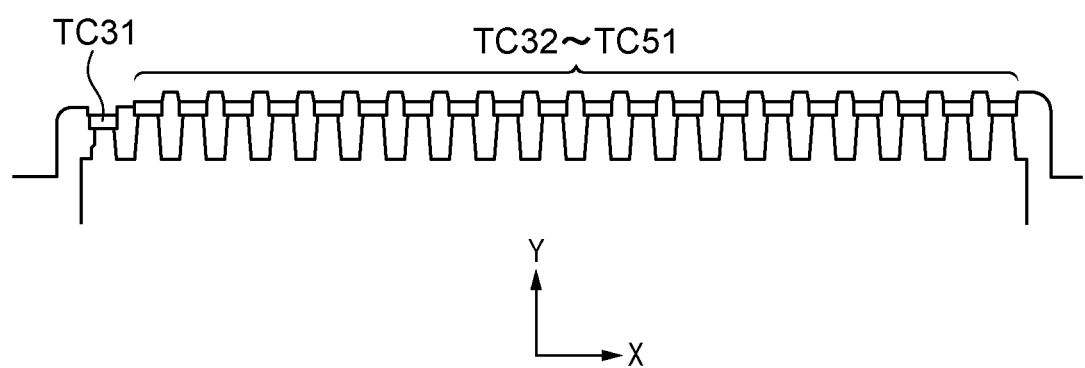
FIG. 7 is a sectional view of a plurality of terminals that constitute the accessory shoe of a second embodiment.

FIG. 7 is a sectional view showing a plurality of terminals that constitute the accessory shoe 123 according to the second embodiment, and is shown in a plane that intersects perpendicularly with the attaching direction of the camera connector 206. The accessory shoe 123 has the terminals TC31 through TC51 arranged in a line at constant intervals. The terminal TC31 is different from the terminals TC32 through TC51 in the height in the vertical direction (equivalent to the Y-direction in FIG. 3A). Specifically, the terminal TC31 is arranged in the position lower than the other terminals TC32 through TC51. Thereby, even if the external flash device 120 is attached in the state where it is inclined to the attaching direction as shown in FIG. 5B, the contact of the terminal TC31 can be delayed intentionally.

As mentioned above, the contact order of the terminals of the camera connector 206 and accessory shoe 123 can be changed by differentiating the heights of the terminals while keeping the arrangement of the terminals in a line. In this way, even if the external flash device 120 is attached in the state where it is inclined to the attaching direction as shown in FIG. 5B, the terminals can be contacted in a predetermined order.

Next, a third embodiment will be described. Hereinafter, a modified example of the external flash device 120 described in the first embodiment will be described. Since the entire configuration of the image pickup apparatus 100 is the same as that of the first embodiment, its description is omitted.

Figure 8A:
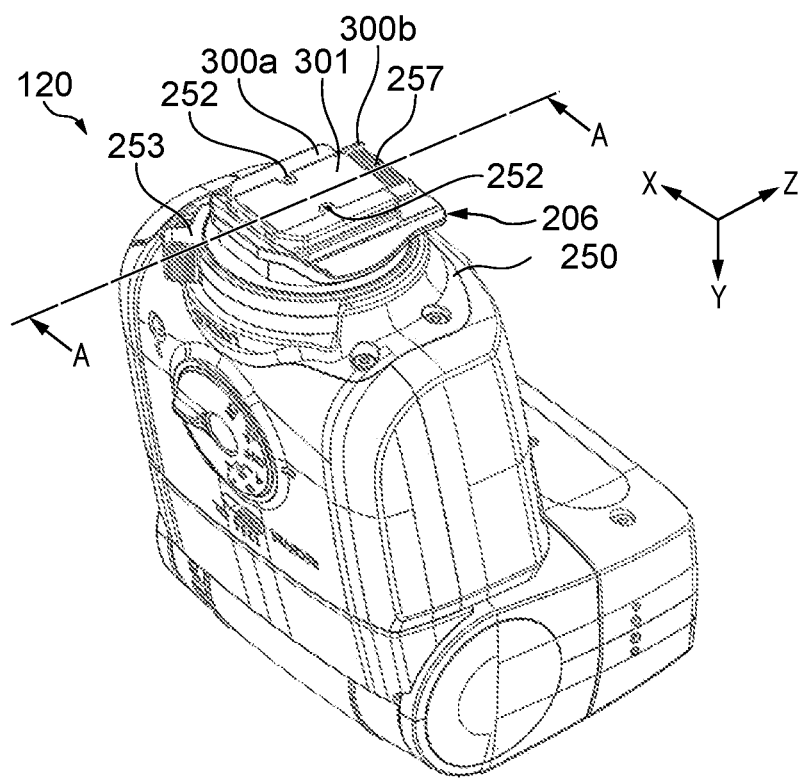
FIG. 8A is a perspective view showing an external flash device of a third embodiment.
Figure 8B:
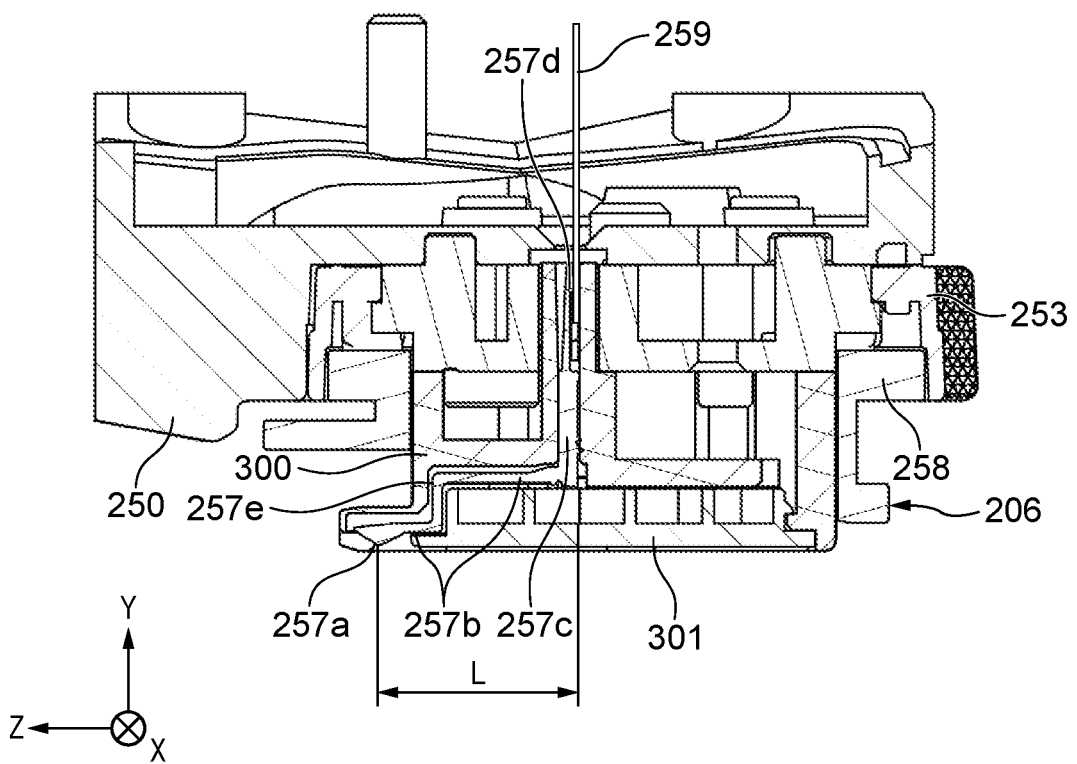
FIG. 8B is a sectional view showing the external flash device shown in FIG. 8A taken along a line A-A.

FIG. 8A is a perspective view showing the external flash device 120 according to the third embodiment viewed from the side of the camera connector 206 (the −Y-direction side (the lower side)). FIG. 8B is a sectional view showing the camera connector 206 taken along a line A-A in FIG. 8A.

The camera connector 206 is provided in the −Y-direction side (the upper side in FIG. 8A, the lower side in FIG. 8B) of a base part 250 of the external flash device 120. The camera connector 206 has a shoe mounting leg 300a, a pair of lock pins 252, a lock lever 253, a connecting plug 300b, a Y-direction holding member 258, a holding member 300, and a shoe cover 301.

The shoe mounting leg 300a is an engagement member that engages the external flash device 120 to the accessory shoe 123 of the image pickup apparatus 100. That is, the shoe mounting leg 300a is the engagement member of the external flash device 120 that is attachable to and detachable from the accessory shoe 123. The lock pins 252 prevent the external flash device 120 from falling from the image pickup apparatus 100 in the state where the camera connector 206 (shoe mounting leg 300a) is attached to the accessory shoe 123. The lock pins 252 are provided in the shoe mounting leg 300a so as to be movable in the Y-direction. The lock pins 252 are held by the Y-direction holding member 258 so as to be movable in the Y-direction. The lock lever 253 and Y-direction holding member 258 are held by the holding member 300.

When the lock lever 253 is rotationally operated in the state where the external flash device 120 is attached to the accessory shoe 123, the Y-direction holding member 258 moves in the −Y-direction by a cam mechanism (not shown). In that time, the lock pins 252 move in the −Y-direction together with the Y-direction holding member 258. Thereby, the lock pins 252 are projected from the shoe mounting leg 300a and engage with engagement holes (not shown) of the accessory shoe 123.

The camera connector 206 is formed from non-conductive material (dielectric material) like resin material and is integrated with the holding member 300. The connecting plug 300b has a plurality of connection terminals 257 that contact the terminals TC01 through TC21 of the accessory shoe 123 for communication. The connection terminals 257 correspond to the terminals TA01 through TA21 described in the first embodiment.

The connection terminals 257 are constituted so as to correspond to the terminals TC01 through TC21 of the accessory shoe 123 one-to-one. The connection terminals 257 are extended in the Z-direction, are arranged in the X-direction at constant intervals, and are held by the holding member 300. Each of the connection terminals 257 has a tip portion 257a that contacts a corresponding terminal among the terminals TC01 through TC21. As shown in FIG. 8B, the tip portion 257a is an approximately triangular portion that is convex to the −Y side when viewed in the X-direction. In the following description, an end of the tip portion 257a in the +Z-direction is called an "attaching direction end". Moreover, a surface reached from the attaching direction end to a lower end (an end in the −Y side) in the tip portion 257a is called a "contact surface".

Each of the connection terminals 257 has an extension portion 257b that extends to the −Z-direction side from the tip portion 257a. The extension portion 257b displaces the tip portion 257a in the +Y-direction by elastic deformation when the tip portion 257a contacts a corresponding terminal among the terminals TC01 through TC21. A vertical portion 257c is formed at the end in the −Z-direction (the rear end) of the extension portion 257b so as to extend in the +Y-direction (the upper side). A flexible-substrate connection portion 257d is formed at the upper end of the vertical portion 257c. The flexible-substrate connection part 257d is connected to a flexible substrate 259 that is connected to a main substrate (not shown) of the external flash device 120 and is inserted into the holding member 300 from the +Y-direction side.

A stepped section 257e that has a step in the Y-direction is formed in the middle of the extension portion 257b, and thereby, the extension part 257b can be deformed elastically in the Y-direction. When a distance L of the extension part 257b in the Z-direction is short, a sufficient deformation amount cannot be obtained. As a result, deterioration of durability is forecasted. Specifically, when attachment and detachment between the terminals TC01 through TC21 (not shown) of the accessory shoe 123 and the tip portions 257a are repeated, the extension part 257b may be easily damaged. In the third embodiment, the sufficient distance L in the Z-direction of the extension part 257b is secured by providing the stepped section 257e in the extension part 257b and required durability is secured.

Next, configurations of the connection terminals 257 for contacting the terminals in a predetermined connection order even when the external flash device 120 is attached to the image pickup apparatus 100 in the state where the attaching direction is inclined as described by reference to FIG. 5B will be described. In the following description, the connection terminals 257 shall be the twenty-one terminals TA01 through TA21 arranged in a line in the X-direction at predetermined intervals as with the first embodiment. Then, the terminals TC01 through TC21 of the accessory shoe 123 and the terminals TA01 through TA21 of the camera connector 206 shall contact one-to-one and be electrically connected.

Figure 9A:
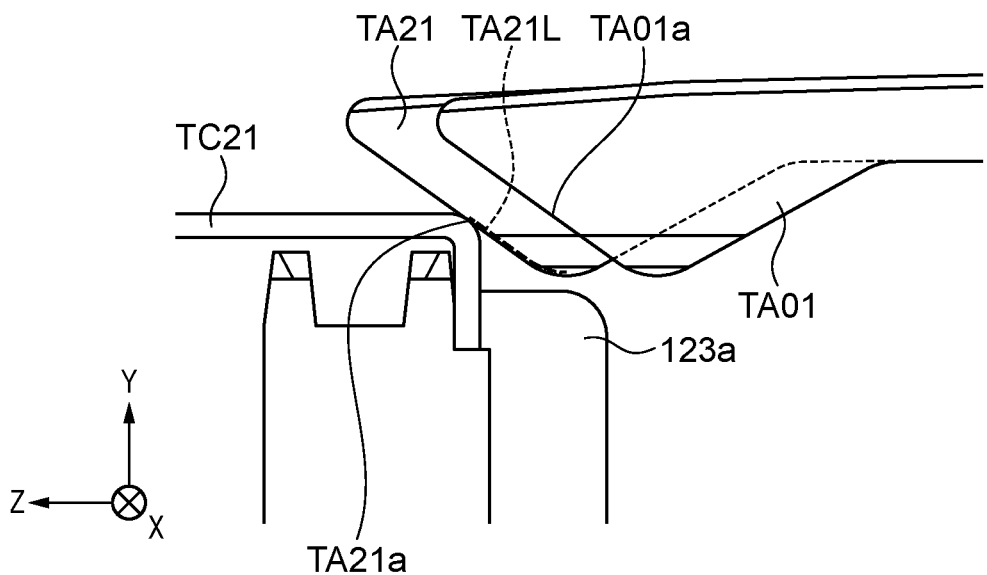
FIG. 9A and FIG. 9B are views showing examples of states where a terminal of the accessory shoe contacts a terminal of the camera connector in the third embodiment.
Figure 9B:
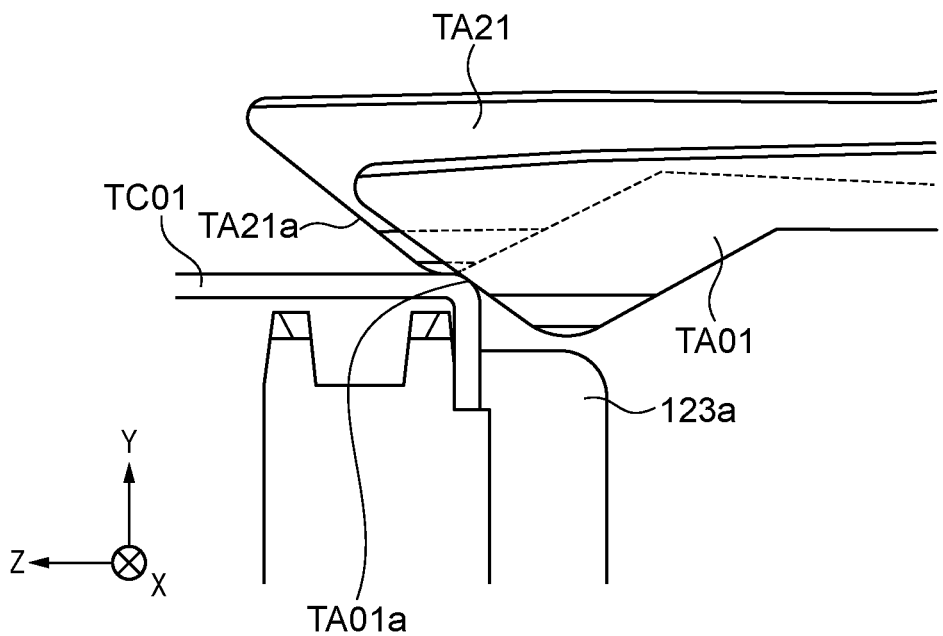

FIG. 9A is a sectional view showing a half-way state of the attaching operation of the camera connector 206 to the accessory shoe 123 and shows a state where the terminal TA21 contacts the terminal TC21. FIG. 9B is a sectional view showing a state where the camera connector 206 is further moved in the +Z-direction from the position shown in FIG. 9A and shows a state where the terminal TA01 contacts the terminal TC01. It should be noted that the terminal TA01 is wanted to delay a contact timing than a contact timing of the terminal TA21.

The terminal TC21 shown in FIG. 9A and the terminal TC21 shown in FIG. 9B are extended in the +Z-direction that is the attaching direction of the external flash device 120 and the −Y-direction that intersects perpendicularly with the attaching direction, respectively, and are held by the low standing wall 123a made from resin material. When viewed in the X-direction, the terminals TC01 and TC21 overlap in entirety approximately.

In the third embodiment, although the terminal TA01 and terminal TA21 have the same shape, the terminal TA01 is shifted by a certain distance in the −Z-direction than the terminal TA21 in the camera connector 206. Accordingly, as shown in FIG. 9A, when the terminal TA21 moves in the +Z-direction and contacts the terminal TC21 at the contact point TA21a, the terminal TA01 does not contact the terminal TC01.

When the camera connector 206 is further moved in the +Z-direction after the terminal TA21 contacts the terminal TC21 at the contact point TA21a, the terminal TA01 contacts the terminal TC01 at the contact point TA01a as shown in FIG. 9B. From the contact of the terminal TA21 to the terminal TC21 until the contact of the terminal TA01 to the terminal TC01, the terminal TA21 moves in the +Z-direction while moving the contact point to the terminal TC21. A moving range TA21L of the contact point is shown by a broken line in FIG. 9A.

That is, in the third embodiment, the contact timing of the terminal TA01 and terminal TC01 can be delayed from the contact timing of the terminal TA21 and terminal TC21 by the period required for moving the contact point of the terminal TA21 to the terminal TC21 over the moving range TA21L. In this way, the contact timing of the terminals TA01 and TC01 can be shifted from the contact timing of the terminals TA21 and TC21 by shifting the positions of the terminals TA01 and TA21 in the Z-direction in the camera connector 206.

It should be noted that the communication of the attachment detection of the external flash device 120 is allocated to the terminals TC01 and TA01 in the third embodiment as with the first embodiment. Accordingly, the attachment detection terminals contact after the other communication terminals and power supply terminals contact as with the first embodiment. When the attachment detection terminals contact, the other communication terminals and power supply terminals have already contacted certainly. Moreover, since the terminal TA21 contacts the terminal TC21 of the accessory shoe 123 prior to the other terminals of the camera connector 206, the GND terminal may be allocated to the terminal TA21. According to the third embodiment, since the contact order of the terminals TA01 through TA21 to the terminals TC01 through TC21 can be adjusted by shifting the positions of the terminals TA01 through TA21 in the Z-direction, the terminals can be easily contacted in order of the GND terminals, communication terminals, power supply terminals, and attachment detection terminals.

Next, a fourth embodiment will be described. In the third embodiment, the contact order of the connection terminals 257 to the terminals of the accessory shoe 123 is adjusted by shifting the positions of the connection terminals 257 of the camera connector 206 in the Z-direction. Against this, in the fourth embodiment, the contact order of the connection terminals 257 to the terminals of the accessory shoe 123 is adjusted by adjusting angles of the contact surfaces of the connection terminals 257 of the camera connector 206. Since the fundamental configurations of the image pickup apparatus 100 and external flash device 120 conform to the configurations in the third embodiment, their descriptions are omitted. Hereinafter, the angles of the contact surfaces of the connection terminals 257 of the camera connector 206 that are the characteristic feature of the fourth embodiment will be mainly described.

Figure 10A:
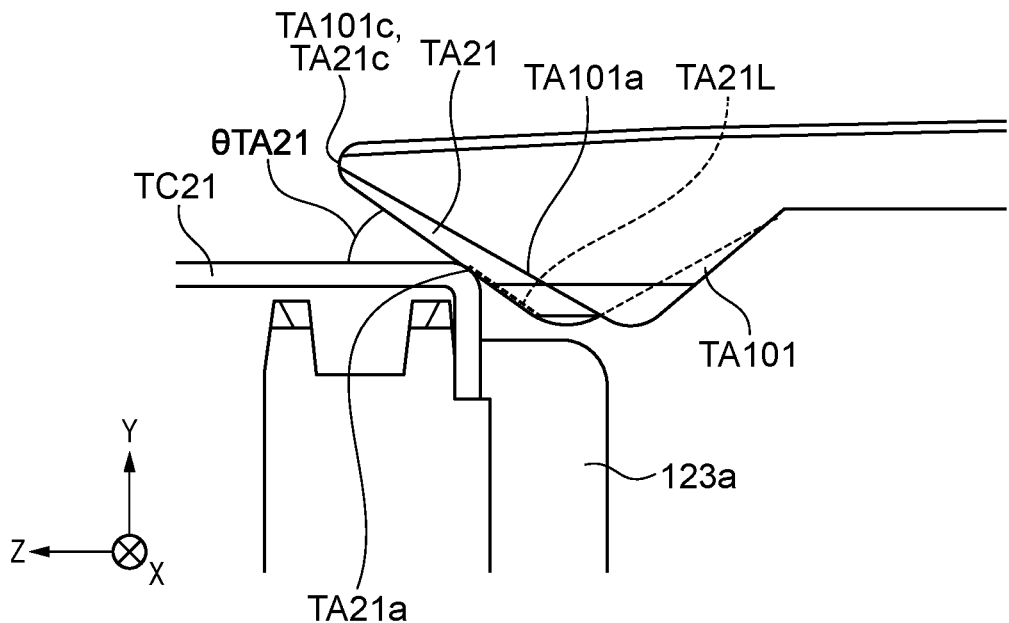
FIG. 10A and FIG. 10B are views showing examples of states where a terminal of the accessory shoe contacts a terminal of the camera connector in a fourth embodiment.
Figure 10B:
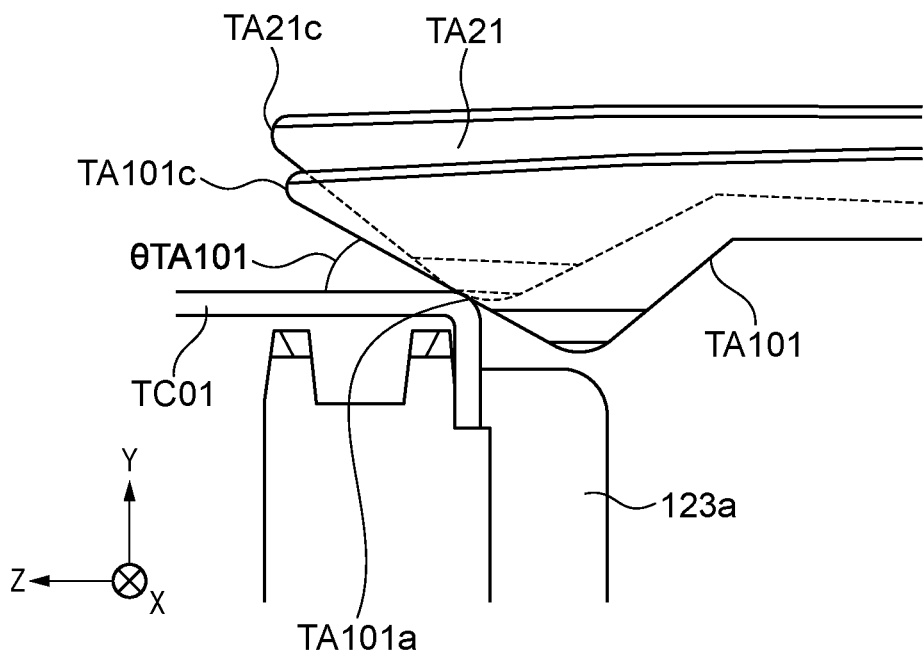

FIG. 10A is a sectional view showing a half-way state of the attaching operation of the camera connector 206 to the accessory shoe 123 and shows a state where the terminal TA21 contacts the terminal TC21. FIG. 10B is a sectional view showing a state where the camera connector 206 is further moved in the +Z-direction from the position shown in FIG. 10A and shows a state where a terminal TA101 contacts the terminal TC01. It should be noted that the terminal TA101 corresponds to the terminal TA01 described in the first and third embodiments, and is wanted to delay a contact timing than a contact timing of the terminal TA21.

The terminal TC21 shown in FIG. 10A and the terminal TC01 shown in FIG. 10B are the same as the terminal TC21 shown in FIG. 9A and the terminal TC01 shown in FIG. 9B, respectively, and their descriptions are omitted.

An end of the terminal TA21 in the +Z-direction shall be an attaching direction end TA21c, and an end of the terminal TA101 in the +Z-direction shall be an attaching direction end TA101c. Moreover, an angle of the contact surface of the terminal TA21 to the terminal TC21 shall be a contact surface angle θTA21, and an angle of the contact surface of the terminal TA101 to the terminal TC01 shall be a contact surface angle θTA101.

In the camera connector 206, the positions of the attaching direction ends TA21c and TA101c in the Z-direction are identical. However, the contact surface angle θTA101 is set to be smaller than the contact surface angle θTA21. Accordingly, as shown in FIG. 10A, the communication due to contact of the terminals TA21 and TC21 at the contact point TA 21a becomes available before the communication due to contact of the terminals T101 and TC01 becomes available.

When the camera connector 206 is further moved in the +Z-direction after the terminal TA21 contacts the terminal TC21 at the contact point TA21a, the terminal TA101 contacts the terminal TC01 at a contact point TA101a as shown in FIG. 10B. From the contact of the terminal TA21 to the terminal TC21 until the contact of the terminal TA101 to the terminal TC01, the terminal TA21 moves in the +Z-direction while moving the contact point to the terminal TC21. A moving range TA21L of the contact point is shown by a broken line in FIG. 10A.

That is, in the fourth embodiment, the contact timing of the terminal TA101 and terminal TC01 can be delayed from the contact timing of the terminal TA21 and terminal TC21 by the period required for moving the contact point of the terminal TA21 to the terminal TC21 over the moving range TA21L. In this way, the contact timing of the terminals TA101 and TC01 can be shifted from the contact timing of the terminals TA21 and TC21 by changing the angles of the contact surfaces of the terminals TA101 and TA21.

It should be noted that the communication of the attachment detection of the external flash device 120 is allocated to the terminals TC01 and TA101 in the fourth embodiment as with the first embodiment. Accordingly, the attachment detection terminals contact after the other communication terminals and power supply terminals contact as with the first embodiment. When the attachment detection terminals contact, the other communication terminals and power supply terminals have already contacted certainly. Moreover, since the terminal TA21 contacts the terminal of the accessory shoe 123 prior to the other terminals of the camera connector 206, the GND terminal may be allocated to the terminal TA21. According to the fourth embodiment, since the contact order of the terminals TA101 through TA21 to the terminals TC01 through TC21 can be adjusted by changing the angles of the contact surfaces of the terminals TA101 through TA21, the terminals can be easily contacted in order of the GND terminals, communication terminals, power supply terminals, and attachment detection terminals.

Next, a fifth embodiment will be described. In the fifth embodiment, a modified example of the fourth embodiment will be described. Although the angles of the contact surfaces of the connection terminals 257 of the camera connector 206 are changed in the fourth embodiment, shapes of the contact surfaces are changed in the fifth embodiment. Since the fundamental configurations of the image pickup apparatus 100 and external flash device 120 conform to the configurations in the third embodiment, their descriptions are omitted. Hereinafter, the terminal shapes of the connection terminals 257 of the camera connector 206 that are the characteristic feature of the fifth embodiment will be mainly described.

Figure 11A:
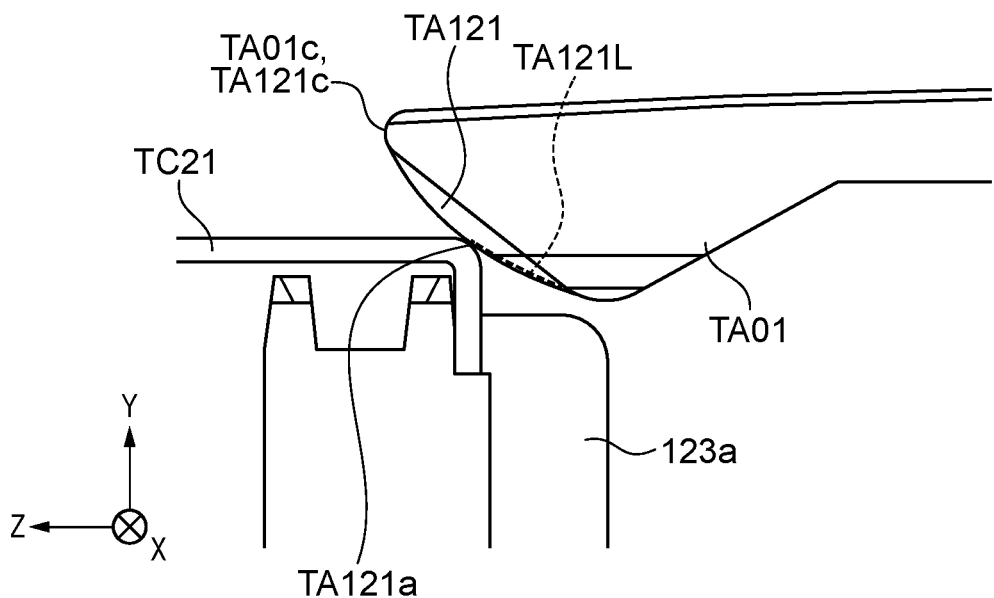
FIG. 11A and FIG. 11B are views showing examples of states where a terminal of the accessory shoe contacts a terminal of the camera connector in a fifth embodiment.
Figure 11B:
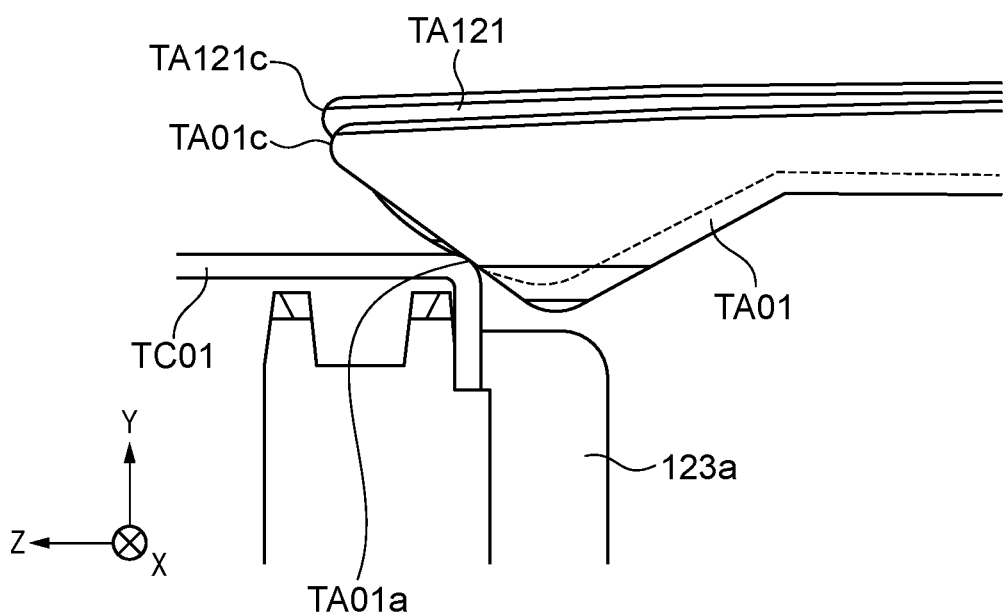

FIG. 11A is a sectional view showing a half-way state of the attaching operation of the camera connector 206 to the accessory shoe 123 and shows a state where a terminal TA121 contacts the terminal TC21. FIG. 11B is a sectional view showing a state where the camera connector 206 is further moved in the +Z-direction from the state shown in FIG. 11A and shows a state where the terminal TA01 contacts the terminal TC01. It should be noted that the terminal TA121 corresponds to the terminal TA21 described in the first and third embodiments. The terminal TA01 is wanted to delay a contact timing to the terminal of the accessory shoe 123 than a contact timing of the terminal TA121.

The terminal TC21 shown in FIG. 11A and the terminal TC01 shown in FIG. 11B are the same as the terminal TC21 shown in FIG. 9A and the terminal TC01 shown in FIG. 9B, respectively, and their descriptions are omitted.

An end of the terminal TA121 in the +Z-direction shall be an attaching direction end TA121c, and an end of the terminal TA01 in the +Z-direction shall be an attaching direction end TA01c. In the camera connector 206, the positions of the attaching direction ends TA121c and TA01c in the Z-direction are identical. However, the contact surface of the terminal TA121 has a curved shape projected (expanded) to the +Z-direction side. Accordingly, as shown in FIG. 11A, the communication due to contact of the terminals TA121 and TC21 at the contact point TA121a becomes available before the communication due to contact of the terminals T01 and TC01 becomes available.

When the camera connector 206 is further moved in the +Z-direction after the terminal TA121 contacts the terminal TC21 at the contact point TA121a, the terminal TA01 contacts the terminal TC01 at the contact point TA01a as shown in FIG. 11B. From the contact of the terminal TA121 to the terminal TC21 until the contact of the terminal TA01 to the terminal TC01, the terminal TA121 moves in the +Z-direction while moving the contact point to the terminal TC21. A moving range TA121L of the contact point is shown by a broken line in FIG. 11A.

That is, in the fifth embodiment, the contact timing of the terminal TA01 and terminal TC01 can be delayed from the contact timing of the terminal TA121 and terminal TC21 by the period required for moving the contact point of the terminal TA121 to the terminal TC21 over the moving range TA121L. In this way, the contact timing of the terminals TA01 and TC01 can be shifted from the contact timing of the terminals TA121 and TC21 by changing the shapes of the contact surfaces of the terminals TA01 and TA121.

It should be noted that the communication of the attachment detection of the external flash device 120 is allocated to the terminals TC01 and TA01 in the fifth embodiment as with the first embodiment. Accordingly, the attachment detection terminals contact after the other communication terminals and power supply terminals contact as with the first embodiment. When the attachment detection terminals contact, the other communication terminals and power supply terminals have already contacted certainly. Moreover, since the terminal TA121 contacts the terminal of the accessory shoe 123 prior to the other terminals of the camera connector 206, the GND terminal may be allocated to the terminal TA121. According to the fifth embodiment, since the contact order of the terminals TA01 through TA20 and TA121 to the terminals TC01 through TC21 can be adjusted by changing the shapes of the contact surfaces of the terminals TA101 through TA21, the terminals can be easily contacted in order of the GND terminals, communication terminals, power supply terminals, and attachment detection terminals.

In the above-mentioned embodiments, one of the terminals TC01 and TC21 of the accessory shoe 123 is used as the terminal that should contact at the beginning, and the other is used as the terminal that should contact at the end. When the contact timings of the terminals TC02 through TC20 need to shift in addition, the contact timings should gradually shift from the terminal TC01 toward the terminal TC21. That is, an effect of delaying the contact timing becomes the largest in the terminal that should contact at the end, and the effect becomes the smallest in the terminal that should contact at the beginning. For example, when the first embodiment is applied to the case where the terminal TC01 is wanted to contact at the end, the heights H01 through H21 of the standing walls for the terminals TC01 through TC21 are set to satisfy H01>H02> . . . >H20>H21. Thereby, even if the external flash device 120 inclines in any direction during the attaching operation, occurrence of a communication error is avoidable.

Even if a terminal that is wanted to delay a contact timing is not arranged at the end of the terminals arranged in a line, the contact order of the terminals can be adjusted by employing the configuration of each of the above-mentioned embodiments, which can avoid occurrence of a communication error.

Next, a sixth embodiment will be described. When the configurations of the accessory shoe 123 described in the first and second embodiments are combined to the configurations of the camera connector 206 described in the third through fifth embodiments, variations of the change of the contact order can be increased. Accordingly, in the sixth embodiment, a concrete example that changes the contact order of the terminals by the combination of the first through fifth embodiments will be described. Hereinafter, a configuration that shifts the contact timings in five stages by combining the first, third, and fifth embodiment will be described.

The contact timings of the terminals TC02 through TC06 and the terminals TA02 through TA06 are shifted in this order. The high standing wall 123b in the first embodiment that is highly formed in the +Y-direction is provided for at least one of the terminals TC02 through TC06. Moreover, the connection terminal 257 that is shifted in the −Z-direction in the third embodiment is applied to at least one of the terminals TA02 through TA06. And the connection terminal 257 that has the curved shape projected in the +Z-direction in the fifth embodiment is applied to at least one of the terminals TA02 through TA06.

Specifically, the contact timing of the terminals TA03 and TC03 is a criterion of the contact order, and the contact timing of the terminals TA03 and TC03 is called a reference timing. The configurations of the terminals TA21 and TC21 shown in FIG. 6A described in the first embodiment are applied to the terminals TA03 and TC03.

The terminals TA02 and TC02 shall be terminals that are wanted to contact prior to the reference timing. In this case, the relationship between the terminals TA121 and TA01 described in the fifth embodiment is applied to the relationship between the terminals TA02 and TA03. The curved shape projected in the +Z-direction is provided in the terminal TA02 as with the terminal TA121 shown in FIG. 11A. Thereby, the contact timing of the terminals TA02 and TC02 can be advanced prior to the contact timing of the terminals TA03 and TC03.

Next, the terminals TC04 and TA04 shall be the terminals that are wanted to contact at a timing later than the reference timing. In this case, the relationship between the terminals TA21 and TA01 described in the third embodiment is applied to the relationship between the terminals TA03 and TA04. That is, in the camera connector 206, the terminal TA04 is arranged at a position shifted in the −Z-direction from the terminal TA03. Thereby, the contact timing of the terminals TA04 and TC04 can be delayed than the contact timing of the terminals TA03 and TC03.

The terminals TC05 and TAOS shall be the terminals that are wanted to further delay the contact timing than the contact timing of the terminals TC04 and TA04. In this case, the terminal TAOS has the same configuration as the terminal TA03, and the standing wall 123b holding the terminal TC05 is formed highly in the +Y-direction than the standing wall holding the reference terminal TA03 by applying the first embodiment. The height of the standing wall 123b in the Y-direction is set so that the terminals TAOS and TC05 will contact after the terminals TA04 and TC04 contact.

The terminals TC06 and TA06 shall be the terminals that are wanted to contact at the end. In this case, the standing wall holding the terminal TC06 is formed highly in the +Y-direction than the standing wall holding the reference terminal TA03 by applying the first embodiment. Moreover, the terminal TA06 is arranged at a position shifted in the −Z-direction from the terminal TA03 in the camera connector 206 by applying the third embodiment. According to the above-mentioned configuration, the contact timings of the terminals TC02 through TC06 and the terminals TA02 through TA06 are shifted in this order.

As mentioned above, according to the present invention, the contact order of the terminals of the accessory shoe and camera connector is arbitrarily changeable. Thereby, even if the attaching operation is performed in the state where the external flash device 120 is inclined to the attaching direction as shown in FIG. 5B, the change of the contact order of the terminals can be prevented, which enables the terminals to contact in the predetermined order.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-076428, filed Apr. 28, 2021, which is hereby incorporated by reference herein in its entirety.

What is claimed is:

1. An electronic apparatus comprising:
an accessory shoe device that is electrically connectable with an accessory and has terminals that are arranged in a line in a first direction that intersects perpendicularly with an attaching direction of the accessory;
standing walls that are formed from dielectric material and are provided adjacently to the respective terminals; and
a controller that is electrically connected to the terminals,
wherein at least one of the terminals differs from other terminals in a length of an externally exposed part in a second direction that intersects perpendicularly with both the attaching direction and the first direction,
wherein each of the terminals has a first portion that extends in the attaching direction and a second portion that extend in the second direction, and
wherein each of the standing walls is provided adjacently to the second portion of each of the terminals, and
wherein at least one of the standing walls differs from other standing walls in height with respect to the second portion in the second direction.

2. The electronic apparatus according to claim 1, wherein the at least one of the standing walls is formed so as to have a slant surface that inclines by a predetermined angle to the second direction.

3. The electronic apparatus according to claim 1, wherein the at least one of the standing walls is formed to a position higher than a corresponding one of the terminals in the second direction.

4. The electronic apparatus according to claim 1, wherein one of the terminals is an attachment detection terminal for detecting attachment of the accessory to the accessory shoe device, and
wherein the standing wall provided to the attachment detection terminal is higher than the standing walls provided to the other terminals.

5. The electronic apparatus according to claim 1, wherein the second portion is arranged at a side, to which the accessory approaches during an attaching operation of the accessory to the accessory shoe device, of the first portion in the attaching direction.

6. The electronic apparatus according to claim 5, wherein each of the standing walls is provided to a side surface of the second portion to which the accessory approaches during the attaching operation.

7. The electronic apparatus according to claim 1, wherein the electronic apparatus comprises an image pickup apparatus.

8. An accessory comprising:
a shoe device that is attachable to an accessory shoe device of an electronic apparatus and has terminals arranged in a line in a first direction that intersects perpendicularly with an attaching direction of the shoe device to the accessory shoe device; and
a controller that is electrically connected to the terminals,
wherein the terminals include a first terminal and a second terminal of which a shape differs from a shape of the first terminal, and
wherein a position of a contact point, which first contacts a terminal of the accessory shoe device during an attaching operation of the shoe device to the accessory shoe device, of the first terminal differs from that of the second terminal in the attaching direction.

9. The accessory according to claim 8, wherein a shape of a tip portion including the contact point of the first terminal is identical to that of the second terminal when viewed in the first direction, and
wherein the first terminal differs from the second terminal in a position of the tip portion in the attaching direction.

10. The accessory according to claim 8, wherein the first terminal differs from the second terminal in a shape of a tip portion including the contact point.

11. The accessory according to claim 10, wherein the first terminal differs from the second terminal in an angle of a surface including the contact point.

12. The accessory according to claim 10, wherein one of the first terminal and the second terminal has a curved shape that projects a surface including the contact point in the attaching direction.

13. The accessory according to claim 10, wherein an end position of the tip portion of the first terminal in the attaching direction is identical to that of the second terminal.

14. The accessory according to claim 10, wherein the first terminal differs from the second terminal in a position of the tip portion in the attaching direction.

15. The accessory according to claim 8, wherein one of the first terminal and the second terminal comprises an attachment detection terminal for detecting attachment of the shoe device to the accessory shoe device, and
wherein the attachment detection terminal is electrically connected to a terminal of the accessory shoe device finally during an attaching operation of the shoe device to the accessory shoe device.

16. The accessory according to claim 15, wherein the terminals include a GND terminal and other communication terminals, and
wherein the GND terminal, the other communication terminals, and the attachment detection terminal are connected to terminals of the accessory shoe device in this order during the attaching operation.

17. The accessory according to claim 8, wherein the accessory is in connection with an image pickup operation.

* * * * *